United States Patent
Mengeringhausen et al.

[11] 3,783,232
[45] Jan. 1, 1974

[54] APPARATUS FOR THE MANUFACTURE OF HOLLOW ROD ELEMENTS

[75] Inventors: Max Mengeringhausen, Wurzburg; Hermann Quenzel, Lengfeld; Reinhold Gehrig, Retzstadt; Willi Spanheimer, Waldbuttelbrunn, all of Germany

[73] Assignee: Mero AG, Zug, Switzerland

[22] Filed: Aug. 9, 1972

[21] Appl. No.: 279,051

Related U.S. Application Data

[63] Continuation-in-part of Ser. No. 234,881, March 15, 1972, abandoned.

[52] U.S. Cl. ............................... 219/124, 219/60 A
[51] Int. Cl. ............................................. B23k 9/12
[58] Field of Search............ 219/124, 125 R, 60 A, 219/60 R, 61, 137, 159

[56] References Cited
UNITED STATES PATENTS

| | | | |
|---|---|---|---|
| 2,753,826 | 7/1956 | Dougherty | 219/159 X |
| 1,875,483 | 9/1932 | Naylor | 219/159 X |
| 2,690,492 | 9/1954 | Asbury et al. | 219/60 |
| 2,479,197 | 8/1949 | Anderson | 219/159 |
| 3,634,648 | 1/1972 | Morris et al. | 219/159 |

Primary Examiner—R. F. Staubly
Assistant Examiner—L. A. Schutzman
Attorney—Brady, O'Boyle & Gates

[57] ABSTRACT

Apparatus for manufacturing hollow rod elements with a pair of end sections connected thereto, including guide bar means having two pairs of adjustable supports individually slidable thereon, the outermost supports carrying rotatable holding and clamping devices supporting the end sections above the guide bar means, with at least one of the outer supports having a motor connected thereto to rotate the clamping and holding devices and hollow rod element held therebetween, and the inner pair of supports carrying arc welding devices and stop members for axially centering the tube on the end sections.

6 Claims, 3 Drawing Figures

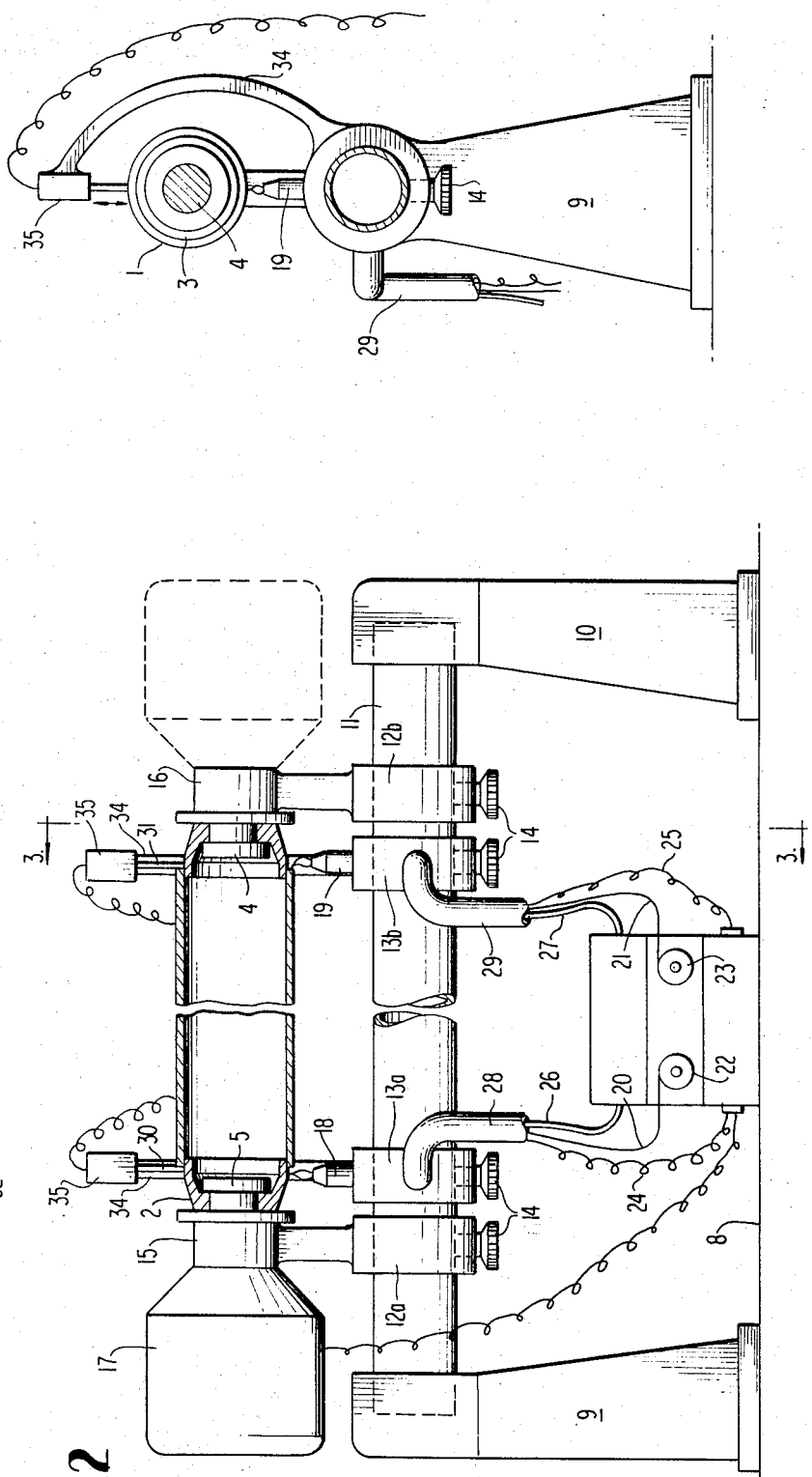

APPARATUS FOR THE MANUFACTURE OF HOLLOW ROD ELEMENTS

CROSS-REFERENCE TO RELATED APPLICATION

This application is a continuation-in-part of application Ser. No. 234,881, filed Mar. 15, 1972 now abandoned.

BACKGROUND OF THE INVENTION

This invention relates to apparatus for the production of rod elements. for example for space frameworks, consisting of a hollow rod and two end sections.

It is conventional to form space frameworks by welding tubes or appropriate profiled rods directly to junction pieces in such a manner that the tube or rod axes intersect in the center of the junction piece with as high a degree of accuracy as possible. This manner of constructing space frameworks requires very extensive, difficult welding operations at the building site. Due to the necessity of carrying out the welding operation at the construction site, perhaps at a great height and under difficult conditions with respect to space, these welding operations require the use of highly qualified personnel.

In order to avoid having to conduct the above welding operations at the construction site, a second kind of space framework has been known wherein the junction pieces are provided with threaded bores, whereas the tubes or profiled rods provide, on both ends, connecting parts with threaded bolts. In this case, so-called end sections are already welded to the end faces of the tubes or profiled rods in a workshop, for receiving the threaded bolts. This procedure completely eliminates welding operations at the building site and thus the employment of highly qualified welders, and the necessary assembly operations can be carried out relatively quickly by auxiliary personnel. However, on the other hand, the end sections to be welded to the tubular or profiled rods and the threaded connecting parts cause additional expenses in addition to the welding work to be conducted in the workshop.

In the manufacturing methods for space frameworks known heretofore wherein welding operations are to be conducted either at the construction site or in the workshop, the question of accuracy with respect to the performance of the welding operations likewise plays a decisive part. Even if the individual structural elements of a rod are manufactured with a high degree of accuracy, there is the danger in the manufacturing processes known that, when the structural elements are welded together, the finished constructions exhibit dimensional discrepancies or that "prestresses" occur therein which can have a troublesome effect when the space framework is subjected to the actual load.

Consequently, this invention is based on the problem of avoiding the above deficiencies and has the purpose of further lowering the expenses for the manufacture of the rod elements with the associated junction point connecting elements, as a prerequisite for employing space frameworks even more successfully in a maximum range of applications, or of restricting to a minimum the amount of work required in the workshop and the total costs for the connecting pieces and the welding work in the workshop; furthermore, it is the object of this invention to arrange the welding operations for the manufacture of the rod elements in such a manner that the finished rod elements exhibit optimum accuracy and that no undesired prestresses are introduced into the assembled space framework.

SUMMARY OF THE INVENTION

To overcome the above-indicated problem, the apparatus of the present invention has been devised which comprises essentially a guide bar having two pairs of adjustable supports individually slidable thereon, the outermost supports carrying rotatable holding and clamping devices supporting the end sections, and at least one of the outer supports having a motor connected thereto to rotate the clamping and holding devices and hollow rod element held therebetween, the inner pair of supports carrying arc welding devices and stop members for axially centering the tube on the end sections.

By this construction and arrangement, rod elements consisting of a hollow rod and two end sections can be manufactured by securing the end sections in position in respectively one rotatable holder; slipping or inserting the hollow rod on or into the end sections; adjusting the spacing of the end sections to the dimension of the finished rod element and centering; tacking together all stationary parts; and thereafter rotating the tacked parts and simultaneously annular welding at the overlaps between the hollow rod and the two end sections.

Thereby, the welding work for the purpose of connecting the end sections with the hollow rods in the form of tubes or profiled rods becomes completely independent of the skill of learned, tested, highly qualified welders and is furthermore considerably shortened as compared to the conventional welding procedure. This is of importance especially when the rod elements for space frameworks are to be industrially manufactured in a country which, on the one hand, has a great need for extensive space frameworks but, on the other hand, does not possess a sufficient number of correspondingly highly qualified skilled welding workers.

With the apparatus of the present invention, it is possible, for example, to reliably and automatically join hollow rods in the form of pipes cut to length with an accuracy of merely 1 or 2 mm. and conical end pieces for the reception of screw connections, which end pieces are produced by forging and consequently likewise exhibit dimensional differences in length of 1–2 mm., in spite of these dimensional deviations, in such a manner that the finished rod element has an accuracy of ± 0.1 mm. At the same time, the apparatus of this invention makes it possible to reduce the working time for the production of a rod element to 1/10 to 1/20 of the customary working time and to employ, in this connection, for the control and supervision of the machine tool, semiskilled personnel in the place of highly qualified welders. In summation, the apparatus of this invention makes it possible to reduce the costs of manufacture of rod elements to such an extent that the total economy is extraordinarily increased.

The two annular welding operations to be conducted between the hollow rod and the two end sections can be carried out simultaneously, in accordance with a further feature of this invention. This results in a further reduction of the working time for producing a rod element.

It is advantageous to synchronize the conductance of the annular welding operations with the rotation of the end sections with the hollow rod tacked thereon, in order to ensure a uniform welding rate.

The annular welding operations are suitably conducted under an atmosphere of protective gas.

BRIEF DESCRIPTION OF THE DRAWINGS

FIG. 1 is a lateral view, partially in section, of a rod element, ready for installation, and manufactured by the apparatus of the present invention;

FIG. 2 is a lateral view of the apparatus of the present invention; and

FIG. 3 is a view taken along line 3—3 of FIG. 2.

DESCRIPTION OF THE PREFERRED EMBODIMENT

Referring to the drawings and more particularly to FIG. 1, the rod element produced by the apparatus of the present invention comprises a hollow rod in the form of a tube 1 and two end sections 2,3 in the form of hollow truncated cones; to the end sections, in turn, threaded bolts 4,5 are attached through the end apertures, with control nuts 6,7. The threaded bolts serve, in a conventional manner, as connecting elements by means of which the rod element can be joined to junction pieces, not shown, of a space framework.

The apparatus employed for manufacturing the rod element of FIG. 1 is shown in FIG. 2, and comprises two pedestals, 9,10 anchored in the floor 8 and carrying, between their upper ends, a guide tube 11 serving as the guide bed. Supports 12a, 12b, 13a and 13b are mounted on the guide tube 11 in an axially displaceable fashion; by means of set screws 14, the supports can be fixed in their respectively adjusted position. The outer supports 12a and 12b are provided, in the present embodiment, with respectively one rotatable holding and clamping device 15,16 for the end sections 2,3. In the embodiment, only one of the holding and clamping devices 15 is equipped with an electric drive motor 17. However, it is also possible to provide both holding and clamping devices 15,16 with synchronous driving motors, as indicated in dashed lines in FIG. 2.

The inner supports 13a and 13b each serve for mounting a shielded electric-arc welding device 18,19 with automatic welding wire feed. The welding wires 20,21 are reeled up on rotatable spools 22,23 and are introduced, together with the welding current lines 24,25 and the feed pipes 26,27 for the protective gas, into the welding apparatus 18,19 through conduits 28,29. The drive motor 17 is connected to the common circuit (not shown) of the electric welding devices 18,19 via a relay, which latter likewise is not shown; this relay synchronizes the actuation of the drive motor 17 with that of the welding apparatus 18,19. In addition, a speed governor, not shown, is provided for the drive motor 17, making it possible to adjust the speed of rotation of the workpiece clamped in devices 15,16 in dependence on its circumference.

A pair of stops 30,31 are each mounted on a respective support 13a, 13b by an arm 34 (FIG. 3). Each stop comprises a plunger, adapted to reciprocate in the direction of the arrows, and actuated by an electromagnet 35. In place of the electromagnet 35, it is also possible to provide a piston-cylinder arrangement, operable hydraulically or pneumatically, for actuating the plunger.

In order to produce a rod element according to FIG. 1, the two threaded bolts 4,5 are first inserted into the end sections 3,2 which latter, in turn, are then clamped into the rotatable holding and clamping devices 15,16. Thereafter, in the embodiment, the tube 1 is pushed over the end sections 2,3 and the spacing of the end sections 2,3 is adjusted to the dimension of the finished rod element. With each stop 30, 31 engaging a respective end of the tube 1, the tube is then axially centered on the end sections 2,3 by sliding the stop supports 13a, 13b longitudinally of the guide tube 11.

After centering the tube 1, all of the parts 1,2 and 3 are tacked together in the stationary condition with the aid of the welding devices 18,19. Thereupon, the drive motor 17 is turned on, whereby the tacked-together parts 1,2 and 3 are rotated and, simultaneously, the devices 18,19 commence with the production of the annular welds 32,33. The coupling of the drive motor 17 with the circuit of the electric-arc welding devices via the relay, not shown, ensures that the actuation and deactivation of the drive motor is congruent with the switching on and switching off operation, respectively, of the welding devices. The speed governor, not shown, for the drive motor 17 is adjusted, together with the welding wire feed, in such a manner that the respectively required welding speed and the necessary electrode gap are provided. It is to be noted that, in the present embodiment, the two annular welding operations producing the welds 32 and 33 between the tube 1 and the two end sections 2,3 are conducted completely automatically and simultaneously.

Since the end sections 2,3 are to be adjusted to the exact length of the finished rod element, they are first of all mounted, in a fixed and accurate manner, in the clamping devices 15,16; the latter, as mentioned above, are arranged so that they can be displaced on the guide tube 11 with respect to their mutual distance, in the direction of the tube axis 1, but they are fixedly attached in a specific, accurately adjusted position during the welding operation so that even the thermal expansions and stresses occurring during the welding step do not exert any deleterious influence on the final length of the finished rod element.

In order to eliminate disadvantageous inaccuracies in the lengths of the cut-to-length tube 1, on the one hand, and the end sections 2,3 to be welded thereto, on the other hand (which end sections, in the embodiment, are forged pieces of the shape of a truncated cone), or in order to be able to work with structural components cut relatively inaccurately with respect to their length, in the interest of an economical mass production, the provision is made according to the invention that the end sections 2,3 are not attached so that they abut the tube, but rather are inserted into the tube before the annular welds 32,33 are effected. It is also possible, conversely, to insert the pipe into the openings of the end sections to achieve the same effect. Any discrepancies between the cut tube 1 and the end sections 2,3 are then compensated for by the more or less extensive mutual overlapping in length. The two annular weld seams 32,33 are formed, in the embodiment, between the rim of the tube 1 and the outer wall of the end cap sections; however, these seams can also be provided between the edge of the end sections and the outer wall of the tube.

As soon as the welding operation has commenced at both end sections, the two end sections entrain the previously tacked-on tube 1 in their rotary motion, so that the weld seams, or annular welds, are formed along the entire periphery of both tube ends. As soon as the annular weld seam has been closed, the welding devices 18 and 19, as well as the drive motor 17, are automatically cut off.

The end sections can be fixedly clamped in a conventional manner by holding and clamping devices which are operated mechanically, hydraulically, or pneumatically.

If it is desired to process tubes having, for example, a rectangular cross section in place of a circular cross section, the welding speed and the electrode gap must be adjusted during the rotation of the parts to be welded together, by conventional means of kinematics (cam disk) and control technique.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

What is claimed is:

1. Apparatus for producing hollow rod elements having accurate dimensions in length from a hollow tube member and a pair of overlapping end caps comprising, a rigidly supported guide bed, a pair of supports mounted in opposed relation on each end of said guide bed, each of said supports connected for individual adjustable movement along said guide bed, a rotatable holding and clamping device connected to the outer support of each pair adapted to respectively securely grip one of the end caps, an electric arc welding device individual to each of the inner supports of each pair and adapted to be positioned by said inner supports adjacent the overlap of the end caps and the ends of the hollow tube extending between the end caps, stop means operatively connected to said guide bed and adjustable relative to said holding and clamping devices for axially centering the hollow tube on the end caps a drive motor connected to rotate at least one of said rotatable holding and clamping devices, welding circuit means for energizing said electric arc welding devices, and circuit means connected to said drive motor and said welding circuit means to synchronize the operation of the drive motor with the operation of the electric arc welding devices.

2. Apparatus as set forth in claim 1 wherein the stop means comprises, at least one stop element slidably attached to the guide bed and extending above the bed in the area of the overlap of the hollow tube member and end caps, and said stop element longitudinally movable to engage and axially center the hollow rod member between the two end caps.

3. Apparatus as set forth in claim 2 wherein the stop element comprises a reciprocatory plunger mounted on the end of an arm, the opposite end of the arm being secured to the inner support.

4. Apparatus as set forth in claim 3 wherein an electromagnet is connected to the plunger to impart the reciprocatory movement thereto.

5. Apparatus as set forth in claim 1, including a speed governor connected to the drive motor, whereby the speed of rotation of the hollow rod element can be adjusted according to its circumference.

6. Apparatus set set forth in claim 5, including individual synchronized drive motors connected to each of the rotatable holding and clamping devices.

* * * * *